US006744338B2

(12) United States Patent
Nikitin

(10) Patent No.: US 6,744,338 B2
(45) Date of Patent: Jun. 1, 2004

(54) RESONANT OPERATION OF MEMS SWITCH

(75) Inventor: Vladimir Nikitin, Campbell, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/054,409

(22) Filed: Nov. 13, 2001

(65) Prior Publication Data

US 2003/0090346 A1 May 15, 2003

(51) Int. Cl.[7] ................................................ H01P 1/10
(52) U.S. Cl. .................... 333/262; 333/259; 333/105; 307/125
(58) Field of Search ................ 333/262, 259, 333/258, 101, 105; 307/125; 200/181

(56) References Cited

U.S. PATENT DOCUMENTS

| | | | | |
|---|---|---|---|---|
| 5,578,976 A | 11/1996 | Yao | ............................ | 333/262 |
| 5,994,982 A | 11/1999 | Kintis et al. | ................. | 333/235 |
| 6,069,540 A | 5/2000 | Berenz et al. | ............... | 333/101 |
| 6,072,686 A | 6/2000 | Yarbrough | ................... | 361/234 |
| 6,094,971 A * | 8/2000 | Edwards et al. | .............. | 73/105 |
| 6,100,477 A | 8/2000 | Randall et al. | ............. | 200/181 |
| 6,127,744 A | 10/2000 | Streeter et al. | ............. | 307/125 |
| 6,144,545 A | 11/2000 | Lee et al. | .................... | 361/233 |
| 6,160,230 A | 12/2000 | McMillan et al. | .......... | 200/181 |
| 6,172,316 B1 | 1/2001 | Jacob | ......................... | 200/181 |
| 6,198,438 B1 | 3/2001 | Herd et al. | .......... | 343/700 MS |
| 6,218,911 B1 | 4/2001 | Kong et al. | ................. | 333/101 |
| 6,229,683 B1 | 5/2001 | Goodwin-Johansson | .... | 361/233 |
| 6,417,743 B1 * | 7/2002 | Mihailovich et al. | ..... | 333/24 C |
| 6,445,195 B1 * | 9/2002 | Ward | .......................... | 324/684 |
| 6,501,268 B1 * | 12/2002 | Edelstein et al. | ........... | 324/244 |
| 6,531,668 B1 * | 3/2003 | Ma | ............................. | 200/181 |
| 6,583,374 B2 * | 6/2003 | Knieser et al. | ............. | 200/181 |

\* cited by examiner

*Primary Examiner*—Robert Pascal
*Assistant Examiner*—Kimberly Glenn
(74) *Attorney, Agent, or Firm*—Joseph P. Abate

(57) ABSTRACT

A switch arrangement includes a MEMS switch connected to a voltage supply system. The MEMS switch has a mechanical resonant frequency. The voltage supply system has a capability for supplying a voltage with a frequency corresponding to the mechanical resonant frequency of the switch. A method includes providing a MEMS switch including a movable part which has a mechanical resonant frequency, and then supplying an AC voltage to the movable part. The AC voltage has a frequency corresponding to the mechanical resonant frequency of the movable part.

6 Claims, 5 Drawing Sheets

RECESSED SWITCH STRUCTURE – OFF STATE

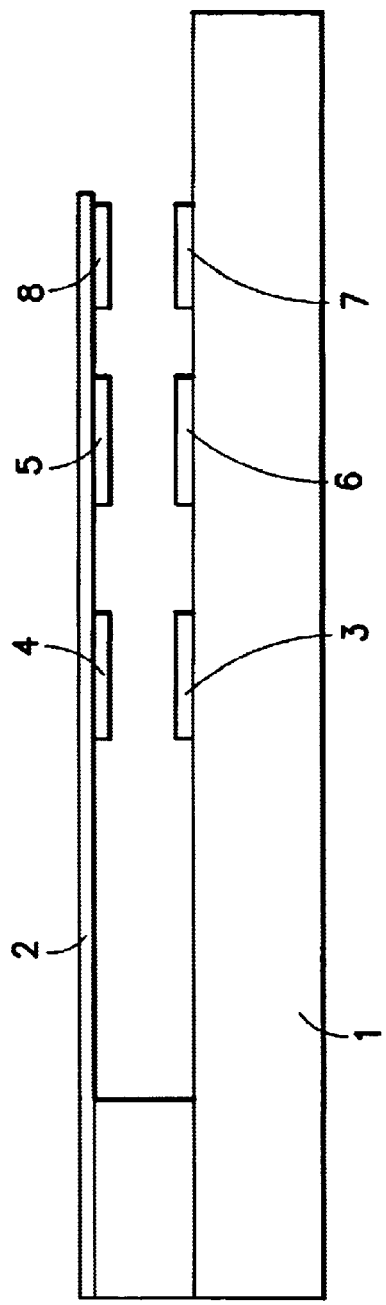

RESONANT OPERATION OF MEMS SWITCH

BACKGROUND OF THE INVENTION

1. Field of the Invention

The present invention relates to electrical switches and, more particularly, to micro-electrical mechanical system (MEM or MEMS) switches.

2. Description of the Related Art

Various micro-electrical mechanical system switches, methods of manufacture and operation are known. See, for example, U.S. Pat. No. 5,578,976, "Micro Electromechanical RF Switch, Jun J. Yao, Nov. 26, 1996; U.S. Pat. No. 6,100,477, "Recessed Etch RF Micro-Electromechanical Switch", John Neal Randall, et al., Aug. 8, 2000; U.S. Pat. No. 6,127,744, "Method And Apparatus For An Improved Micro-Electrical Mechanical Switch", Robert D. Streeter, et al., Oct. 3, 2000; U.S. Pat. No. 6,160,230, "Method And Apparatus For An Improved Single Pole Double Throw Micro-Electrical Mechanical Switch", Lee A. McMillan, et al., Dec. 12, 2000; and U.S. Pat. No. 6,229,683, "High Voltage Micromachined Electrostatic Switch," Scott Halden Goodwin-Johansson, May 8, 2001, which are all incorporated in their entireties herein by reference.

In FIG. 1, a known cantilever type MEMS switch is shown, while FIG. 2 shows a known bridge/membrane type MEMS switch. Such switches are fully described, eg, in U.S. Pat. Nos. 5,578,976 and 6,100,477, and therefore need not be further discussed.

Practical implementations of the two major types of MEMS switches, namely cantilever and bridge MEMS switches, is limited by tradeoffs between operating voltages and mechanical properties of the switch.

On the one hand, the operating voltage controlling the state of the switch is limited by the available voltages on the device, which are typically low for mobile devices. On the other hand, it is desired to have a large mechanical separation between MEMS components to reduce a parasitic load of the RF line and also to avoid a self-closing of the switch induced, eg, by high power RF signals. Additionally, in order to increase MEMS switching speed, the mechanical spring constant of the switch is preferably high, aiding a fast return to the open state by the restoring force. A high mechanical spring constant also helps to avoid stiction problems in MEMS switches. However, MEMS switches with large separations and high spring constants require a strong force to close the switch, which, in turn, require higher operating voltages.

The present invention allows MEMS switches to operate at considerably smaller voltages than the standard method of controlling the switch state with an applied DC voltage, and can be easily implemented for various MEMS switch designs. The present invention helps to improve the MEMS switch performance by allowing increased spring constants and larger separation distances between electrodes (thus, decreasing stiction and parasitic capacitance problems), while operating MEMS switches at small control voltages.

Additionally, the present invention provides a method for achieving a fast settling time when opening the switch. A problem in MEMS switches is that when the switch is opened, in returning to an open state, it undergoes a damped oscillatory motion. The fully open state is not reached until a steady state is obtained. Use of the control circuit of the present invention allows a significant reduction in the time required to reach the steady rate.

According to the invention: to operate the switch (close or open, depending on the design; but for purposes of explanation, the closed state in this invention is defined as the cantilever or membrane in a down position), instead of applying a constant voltage to the control electrodes, an oscillating voltage at a frequency corresponding (eg, equal) to the mechanical resonant frequency of the MEMS movable part (cantilever or membrane, with any and all electrodes provided thereon) is applied to the MEMS control electrodes.

Because of resonance, the amplitude of the movable part deflection will increase with each cycle of the applied AC voltage, producing deflections much larger than those obtained at DC operation. The attraction force between control electrodes is larger for smaller separation between control electrodes (roughly $F \sim 1/d^2$). As the amplitude of deflection increases, the distance between control electrodes sweeps through a minimum. When deflection reaches an amplitude such that the attractive force is greater than the restoring spring force of the movable part (primarily, the cantilever or membrane), a DC voltage is applied to the control electrodes, and the switch closes.

Accordingly, it is an object of the present invention to provide a MEMS switch arrangement which requires smaller operating voltages than typically used.

It is an additional object of the present invention to provide a MEMS switch arrangement which reduces stiction and parasitic capacitance problems.

It is a further object of the present invention to provide a MEMS switch arrangement which permits a higher spring constant of the movable part and a larger separation distance between electrodes of the MEMS switch.

It is an additional object of the present invention to provide a MEMS switch arrangement which utilizes an AC voltage for moving the movable part.

It is an additional object of the present invention to provide a MEMS switch arrangement which utilizes both a DC voltage and an AC voltage for moving the movable part.

It is a further object of the present invention to obtain faster return to open position by introducing an external damping to the MEMS switch. A voltage proportional to the deflection velocity is applied to the control electrodes 180 degrees out of phase with respect to a downward motion of the cantilever or membrane. By doing so, the mechanical oscillation of the cantilever or membrane returning to its open position is damped, and a faster return to open position is achieved.

Further and still other objects of the present invention will become more readily apparent when the following detailed description is taken in conjunction with the accompanying drawing figures.

BRIEF DESCRIPTION OF THE DRAWINGS

FIG. 3 is a side schematic view of a cantilever type MEMS switch forming part of the present invention;

FIG. 4 is a top schematic view of the switch shown in FIG. 3;

DETAILED DESCRIPTION OF THE PREFERRED EMBODIMENT AND BEST MODE

Figure 1:
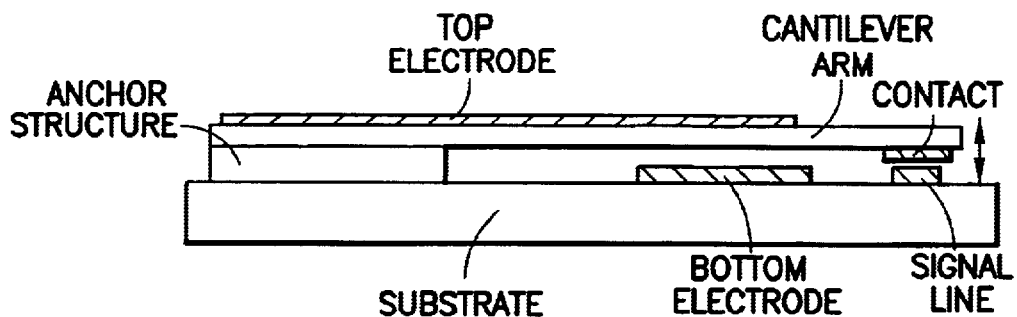
FIG. 1 is a side schematic view of a known cantilever type MEMS switch.
Figure 2:
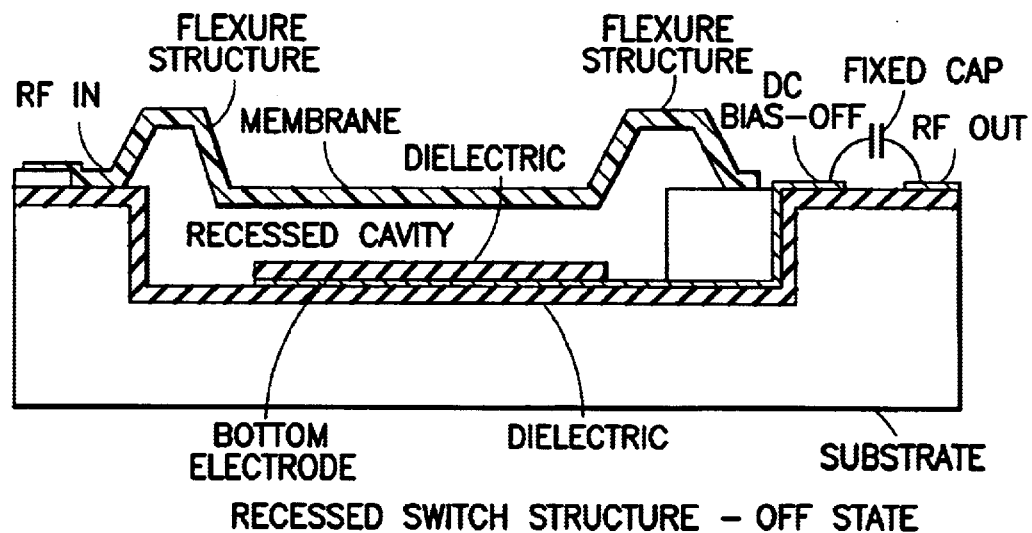
FIG. 2 is a side schematic view of a known bridge/membrane type MEMS switch.
Figure 5:
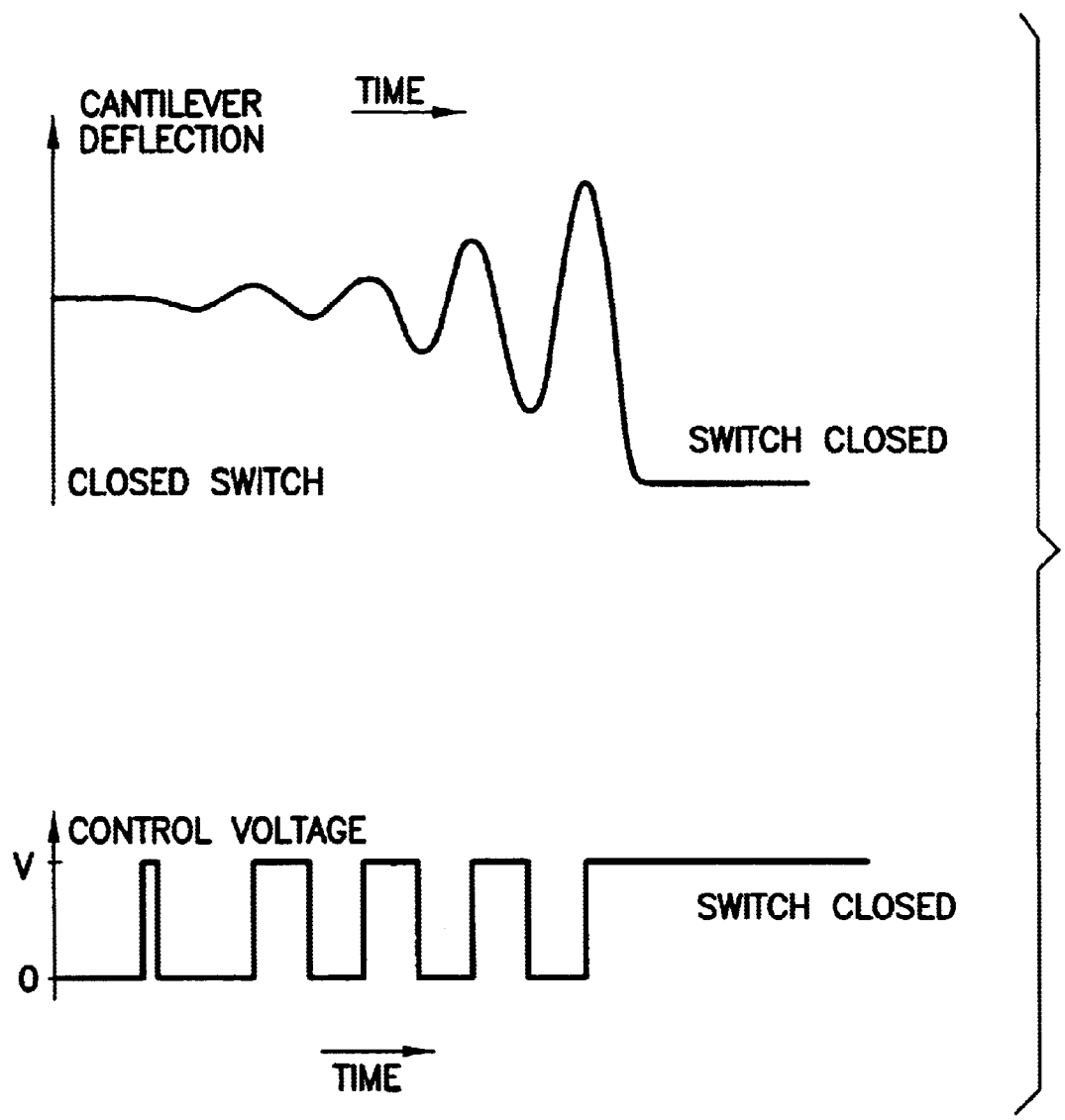
FIG. 5 is a diagram showing cantilever deflection and control voltage timing for the switch shown in FIG. 3, according to one preferred embodiment of the present invention.

FIGS. 3–7 illustrate a preferred embodiment of the present invention.

In FIGS. 3 and 4, a substrate 1 is provided with a MEMS cantilever 2, top and bottom electrodes 3,4 for measuring capacitance, top and bottom control electrodes 5,6 for enabling MEMS movement, interrupted RF line 7, conductive contact 8 for the RF line. Except for the presence of the electrodes 3,4, the MEMS switch of FIGS. 3 and 4 is a well known cantilever type MEMS switch. Alternatively, instead of the additional set of electrodes 3,4 for measuring capacitance, the control electrodes 5,6 are used for both applying the control voltage and measuring the capacitance. However, for the purposes of simplicity in illustrating the principle of operation, the separate pair of electrodes 3,4 is discussed in the present invention. The movable part of the MEMS switch (FIGS. 3, 4) includes the cantilever 2, the electrodes 4,5 and the contact 8.

Figure 6:
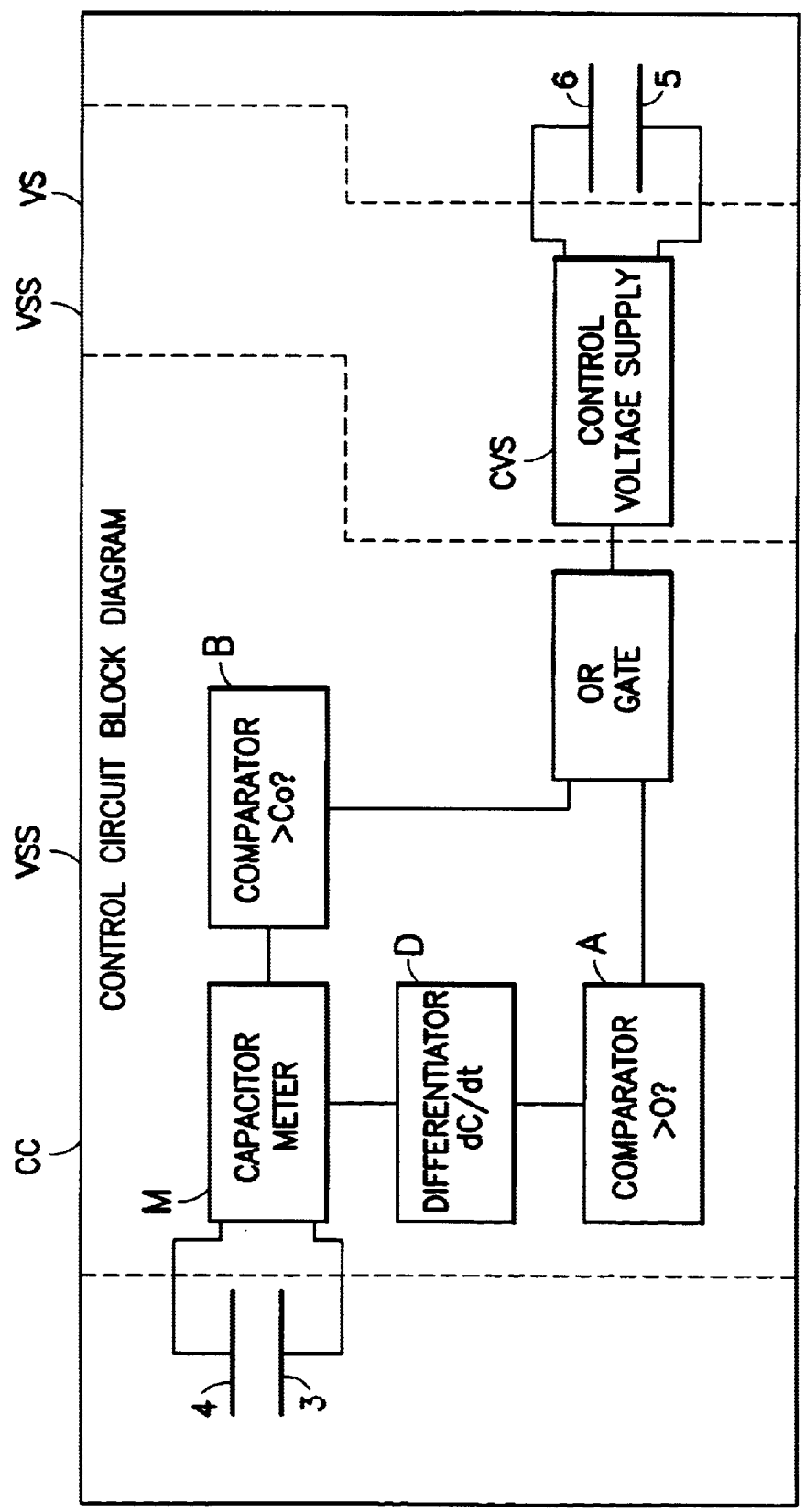
FIG. 6 is a block functional schematic diagram of a voltage supply system according to the preferred embodiment of the present invention.
Figure 7:
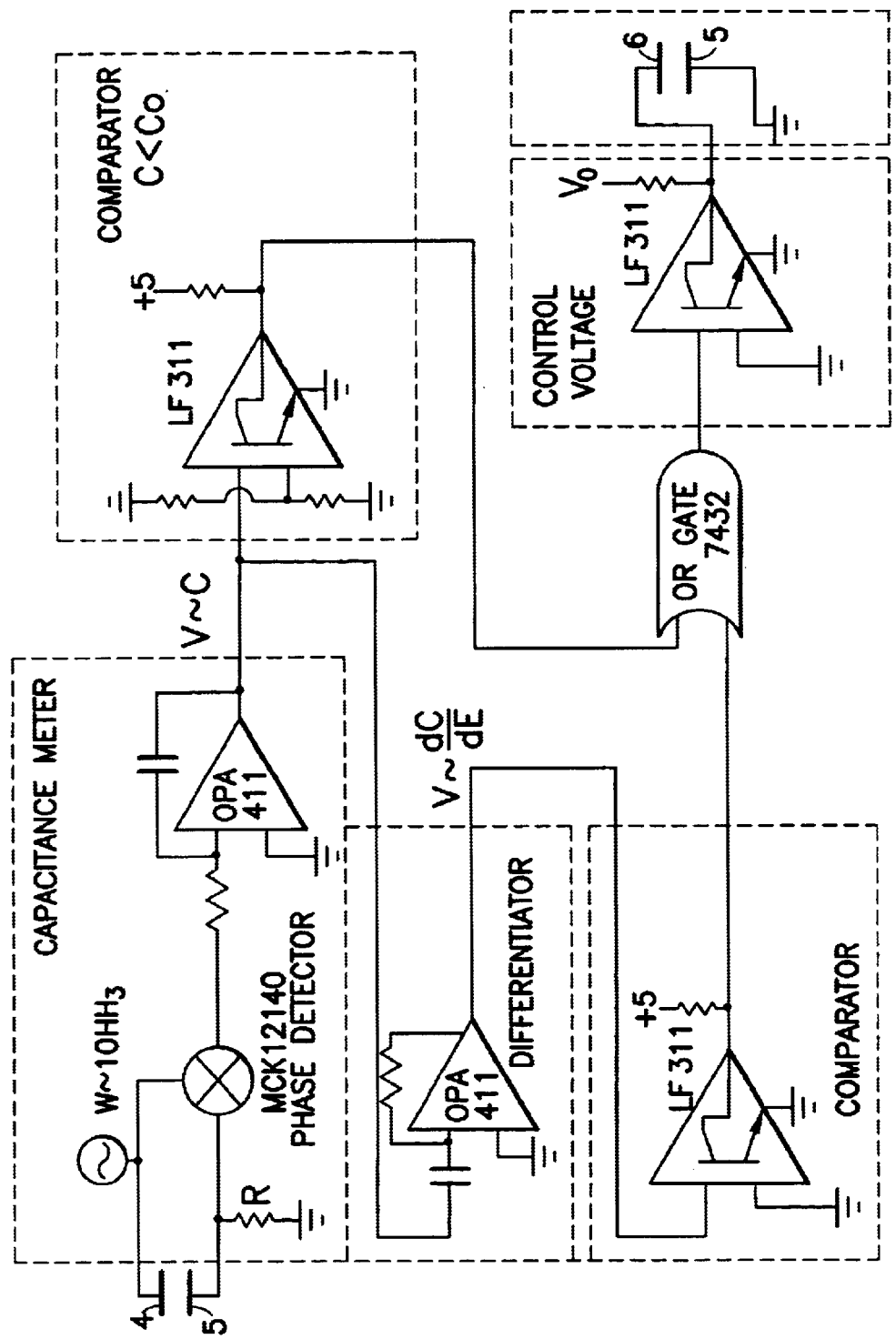
FIG. 7 is a more detailed schematic circuit diagram of the voltage supply system of FIG. 6.

FIG. 6 shows a preferred embodiment for the voltage control system VSS of the present invention, while FIG. 7 shows one implementation of the system VSS. VSS outputs an AC voltage having a frequency of corresponding (eg, equal) to the mechanical resonant frequency of the movable part 2,4,5,8. The mechanical resonant frequency is proportional to a spring constant of the movable part.

First, we discuss the mode of operation for closing the MEMS switch. Application of a voltage difference between the electrodes 5,6 (control electrodes forming a capacitor) results in an attractive force between the movable part 2,4,5,8 and the substrate 1 provided with the electrodes 3,7,6. The magnitude of the attractive force is inversely proportional to d^2, where d is the distance between the cantilever 2 and substrate 1. The spring force of the cantilever 2 is opposing this motion with a magnitude roughly proportional to d. The electrodes 4,3 form a capacitor whose value C is inversely proportional to d. This capacitor is used in an arrangement for measuring deflection and generating an AC control voltage which is applied to the electrodes 5,6 by the control electronics VSS (described later). In the closed position (cantilever 2 deflected down), the RF waveguide 7 is shorted by the conductive element 8.

An external digital signal (not shown) is applied to, eg, commanding the switch to close. This digital signal triggers the control circuit VSS, which performs as follows. See FIGS. 5, 6, 7.

First, a short pulse (FIG. 5—eg, one millisecond) of the maximum available voltage amplitude Vo (eg, in a range of three—five volts) is applied to the control electrode 6. This causes a small deflection of the cantilever 2 towards the base 1. The motion is detected in the meter M by the change in capacitance C (capacitor formed by electrodes 3,4); as the cantilever 2 moves towards base 1, the capacitance C increases. The differentiator D is outputting the derivative dC/dt of the changing capacitance C which is fed to the comparator A. When the derivative is positive (cantilever moving towards the contact and, thus, capacitance is increasing), the comparator A outputs a digital 1 signal, otherwise it outputs a digital 0 signal. This digital signal triggers the voltage control circuit CVS which suitably outputs the voltage Vo to the control electrodes 5,6. Thus, a voltage (and, therefore, an attractive force between 2 and 1) is applied to the control electrodes in phase with the downward movement of the cantilever, and, therefore, creates a self-resonating system with increasing amplitude of the cantilever deflection. The function of the comparator B and the OR gate is to apply or turn on the constant voltage Vo at the instant when an amplitude of the deflection is large enough for the attractive force between 4 and 3 to overcome the restoring spring force of the cantilever 2. This is determined by the capacitance C between 4,3 increasing above a value Co (Co is a capacitance at which the attractive force between 4 and 3 with applied voltage Vo is equal to the spring force of the cantilever).

The electronic control circuit VSS described herein is only a preferred example for achieving the desired mechanical resonance condition of the MEMS switch. There are multiple variations on the control circuit design, one of which is based on a phase-lock loop detection, and others commonly used in self-resonant feedback systems. However, regardless of the electronic circuit implementation, a primary aspect of the invention is the use of the intrinsic mechanical resonance property of the MEMS switch to help control the frequency of the applied voltage.

Improving the mechanical quality factor Q of the MEMS switch can improve switching speed and can also further reduce requirements on the operating voltage.

The mathematical theory to calculate the mechanical resonant frequency of the movable part is well known. See, for example, *Mathematical Methods in the Physical Sciences*, by Mary L. Boas; (2d edition, Wiley & Sons, dated 1983), Chapter 8, which is incorporated in its entirety by reference. Forced vibration of a damped oscillator is described by a differential equation $$\frac{d^2 y}{dt^2} + 2b\frac{dy}{dt} + \omega^2 y = F\sin(\omega' t),$$

which has the solution for the amplitude of the vibration at the driving frequency:

$$y_p = \frac{F}{\sqrt{(\omega - \omega')^2 + 4b^2\omega'^2}} \sin(\omega' t - \varphi);$$

ω=2πf, f=frequency of driving voltage Vo, y=deflection of movable part, F=external force, b is dependent on mass, length and speed of the movable part and is related to the mechanical resonant frequency as would be well understood by those skilled in the art in view of the present description. According to the invention: f is a frequency within a range of, eg, 1 KHz–100 KHz and corresponds to the mechanical resonant frequency of the movable part; C is within a range of, eg, 0.1 picofarads–10 picofarads; Co is a value, eg, 0.10 picofarads–100 picofarads.

FIG. 7 shows a self-explanatory schematic circuit diagram of one embodiment for VSS.

To help solve a problem of oscillation of the cantilever after the switch is open, the control circuit VSS is used in the following way. After receiving the digital signal to open the switch, the control voltage Vo is removed from the electrodes 5,6. The restoring force of the cantilever causes movement of the cantilever 2 away from the base 1, and, as this happens, the capacitance C is decreasing. The same control circuit is used with the exception of the comparator A which now outputs a digital 1 when the dC/dt is negative (<0). Thus, a force is applied to the cantilever 180 degrees out of phase with its deflection. This leads to a faster damping of its motion, and, thus, a faster return to the open position.

To address cases of severe stiction problems, a similar approach of resonating the switch can be used to open it. In this case, the switch can be driven at a second harmonic of the fundamental resonant frequency (this will exert the force on the end of the cantilever).

While there has been shown and described what is considered to be preferred embodiments of the present invention, it will be apparent to those skilled in the art that various changes and modifications may be made therein without departing from the spirit and scope of the present invention which shall be limited only by the scope of the appended claims. For example, VSS can be implemented as discrete components or as one or more integrated circuits.

What is claimed is:

1. A switch arrangement, comprising a MEMS switch connected to a voltage supply system, said MEMS switch having a mechanical resonant frequency, and said voltage supply system having a capability for supplying a voltage with a frequency corresponding to said mechanical resonant frequency, wherein said MEMS switch further comprises pairs of electrodes, and wherein said voltage supply system comprises:

a voltage supply having an input and outputs, said outputs being connected to a first pair of said electrodes;

a logic gate having at least one input and an output, said output of said logic gate being connected to said input of said voltage supply;

a first comparator having an input and an output, said output of said first comparator being connected to said at least one input of said logic gate;

a differentiator having an input and an output, said output of said differentiator being connected to said input of said first comparator, and a capacitor detector having inputs and at least one output, said at least one output of said capacitor detector being connected to said input of said differentiator, said inputs of said capacitor detector being connected to a second pair of said electrodes.

2. The switch arrangement as claimed in claim 1, wherein said MEMS switch includes a movable part having said mechanical resonant frequency.

3. The switch arrangement as claimed in claim 1, wherein said capacitor detector has a second output, said logic gate has a second input, and wherein said voltage supply system further comprises a second comparator having an input and an output, said output of said second comparator being connected to said second input of said logic gate, and said input of said second comparator being connected to said second output of said capacitor detector.

4. The switch arrangement as claimed in claim 1, wherein said logic gate is an OR gate.

5. The switch arrangement as claimed in claim 1, wherein said MEMS switch is of a cantilever type.

6. The switch arrangement as claimed in claim 1, wherein said MEMS switch is of a bridge type.

* * * * *